(12) United States Patent
Chen et al.

(10) Patent No.: US 6,629,119 B1
(45) Date of Patent: Sep. 30, 2003

(54) ARITHMETIC DEVICE AND METHOD WITH LOW POWER CONSUMPTION

(75) Inventors: Oscal T. -C. Chen, Yung-Ho (TW); I-Ping Hsu, Hsinchu Hsien (TW); Ruey-Liang Ma, Ilan Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/452,219

(22) Filed: Dec. 1, 1999

(30) Foreign Application Priority Data

May 6, 1999 (TW) ........................................ 88107332 A

(51) Int. Cl.[7] .............................................. G06F 7/52
(52) U.S. Cl. ...................................................... 708/620
(58) Field of Search ................................. 708/655, 620, 708/518, 402, 210, 211, 212, 711, 712, 490; 711/212

(56) References Cited

U.S. PATENT DOCUMENTS

| | | | | |
|---|---|---|---|---|
| 5,390,135 A | * | 2/1995 | Lee et al. ................... | 708/518 |
| 5,404,474 A | * | 4/1995 | Crook et al. ................ | 711/212 |
| 5,517,439 A | * | 5/1996 | Suzuki et al. .............. | 708/655 |
| 5,615,140 A | * | 3/1997 | Ishikawa .................... | 708/518 |

OTHER PUBLICATIONS

Chandrakasan et al., "Minimizing Power Consumption in Digital CMOS Circuits", Proceedings of the IEEE, vol. 83, No. 4, pp. 498–523, Apr. 1995.

Tong et al., "Minimizing floating–point power dissipation via bit–width reduction" pp. 114–118, Proc. of Power Driven Microarchitecture Workshop, Spain, Jun., 1988.

Phatak, D., "Hybrid Signed Digit Representation for Low Power Arithmetic Circuits", pp. 124–129, Proc. of Power Driven Microarchitecture Workshop, Spain, Jun., 1988.

\* cited by examiner

Primary Examiner—Chuong Dinh Ngo
Assistant Examiner—Chat C. Do
(74) Attorney, Agent, or Firm—Fish & Richardson P.C.

(57) ABSTRACT

An arithmetic device with low power consumption includes master latches, a dynamic range detection unit, slave latches, an operation unit, and a word-length restoration unit. In the arithmetic device, the master latches latch a plurality of (such as two) input data. The dynamic range detection unit detects the effective dynamic range of these input data. The slave latches latch the values of the effective dynamic-range bits of these input data. The operation unit performs predetermined operations of the bits of these effective dynamic range to obtaing an operation result. Since the operation unit only performs operations of the bits of the effective dynamic range, the circuit corresponding to other bits will not demonstrate switching of power consumption, thereby lowering the overall power consumption. Furthermore, the word-length restoration unit will complement the operation result to its original output length in association with the sign of the operation result, for obtaining the correct operation result.

15 Claims, 13 Drawing Sheets

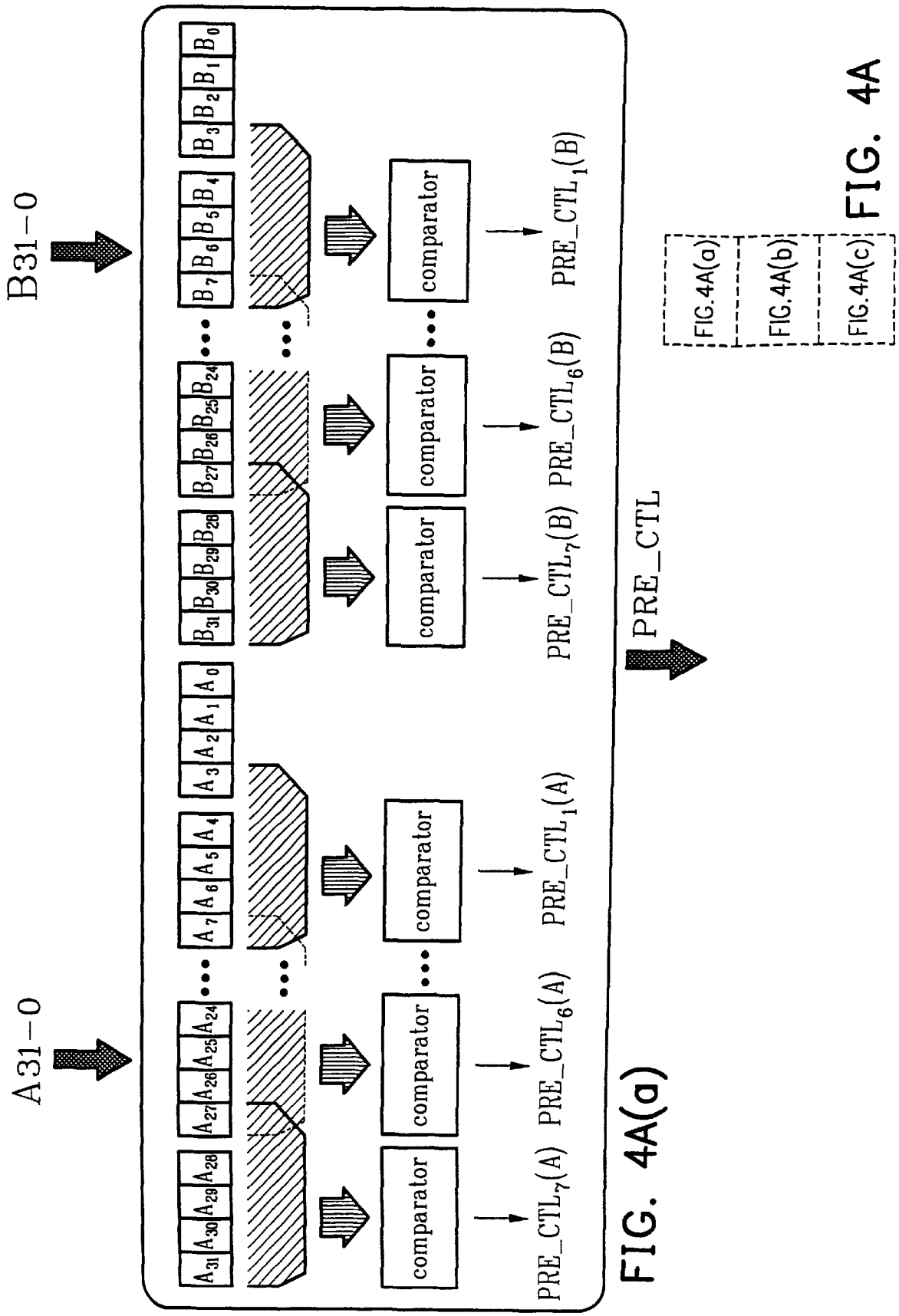

ARITHMETIC DEVICE AND METHOD WITH LOW POWER CONSUMPTION

FIELD OF THE INVENTION

This invention relates to an arithmetic device with low-power consumption and method of reducing power consumption of an arithmetic device. The principle of design is to detect the effective dynamic range of the input data before performance of operations, and then perform the operations of the bits of the dynamic range so as to reduce the switching frequency of the switch of said arithmetic device and thereby reduce the power consumption.

BACKGROUND OF THE INVENTION

Reducing power consumption is a current design factor of microprocessors and communication products. Such products often use devices, which in many applications, particularly for multimedia generally consume power by the charge-discharge operations at the capacitance nodes. The power consumed is:

$$P_{switching} = \alpha C V_{dd}^2 f_{clk} \quad (1)$$

where $\alpha$ is the switching activity, C is the load capacitance, $V_{dd}$ is the operating voltage, and $f_{clk}$ is the operating frequency. Further, $\alpha C$ is considered to be the effective load capacitance for charge-discharge activities.

It can be seen from equation (1) that power consumption can be minimized by: reducing the operating voltage, reducing the operating frequency, and reducing the effective load capacitance. Since the reduction of operating voltage and operating frequency also results in a reduction of the performance of the circuit, the reduction of load capacitance is the best alternative for reducing power consumption without affecting performance.

Generally, reducing the effective load capacitance can be accomplished with an algorithm for improving the operating modes (reducing charge-discharge frequency) or the circuit construction. Taking a fixed-point number system for example (whether represented in 1 or 2 complement), when the change of positive and negative numbers is processed, the load capacitance continues to charge or discharge due to sign extension, thus resulting in excessive power consumption. Therefore, the sign-magnitude number system has been proposed for data interpretation. As a result, the sign-extension bits of the positive and negative numbers are substituted with a bit to save the power consumption of the sign-extension bits when the effective dynamic range of the input data do not span the entire word length. However, this method complicates the circuit construction.

SUMMARY OF THE INVENTION

Accordingly, a primary object of this invention is to provide an arithmetic device and method for reducing power consumption without reducing the operating voltage or the operating frequency of circuitry in the device.

Another object of this invention is to provide an arithmetic device and method for reducing power consumption, which determines the particular functional blocks of an arithmetic device that will be used according to the effective dynamic range of input data. Consequently, power consumption of unused functional blocks of an arithmetic device can be prevented.

A further object of this invention is to provide an arithmetic device and method for reducing power consumption, wherein low-power operations are realized with data types of a digital system.

Yet another object of this invention is to provide an arithmetic device and method with reduced power consumption for various operating units which meet the mainstream needs for portable products as well as environmental protection.

To achieve the above and other objects, this invention provides a low power consumption arithmetic device comprising master latches, a dynamic range detection unit, slave latches, an operation unit, and a word-length restoration unit. In said arithmetic device, the master latches latch plural (such as two) input data. The dynamic range detection unit detects the effective dynamic range of these input data. The slave latches store the values of effective dynamic-range bits of these input data. The operation unit performs predetermined operations of the effective dynamic-range bits for obtaining an operation result. Since the operation unit performs only operations of the effective dynamic-range bits, the circuit corresponding to the other bits will not demonstrate switching (power consumption), thereby lowering the overall power consumption. Furthermore, the word-length restoration unit will compensate the operation result to its original output length in association with the sign of the operation result, for obtaining the correct operation result.

In said arithmetic device with low power consumption, the master latches and the slave latches are formed with flip-flops. Moreover, the operation unit can be an adder, a multiplier or another device.

Further, this invention also provides a method of reducing the power consumption of the arithmetic device in the following basic steps: first, input plural operating data and detect the dynamic ranges of said plural data; next, perform predetermined operations of the effective dynamic-range bits of input data A and B to obtain an operation result. Then, compensate the output data to the original output length in accordance with the effective dynamic range and the sign of the operation result. Consequently, the correct operation result is realized with less switching (less power consumption).

BRIEF DESCRIPTION OF THE DRAWINGS

The aforementioned objects, features and advantages of this invention will become apparent by referring to the following detailed description of a preferred embodiment with reference to the accompanying drawings, wherein.

DETAILED DESCRIPTION OF THIS INVENTION

Figure 1:
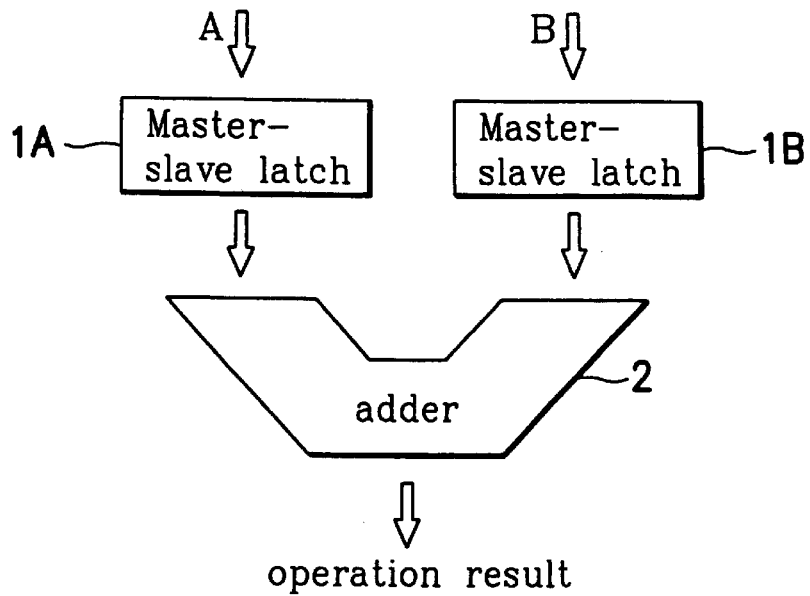
FIG. 1 illustrates the structure of a conventional adder.

Referring to FIG. 1, a diagram illustrating the structure of a conventional 32-bit adder is shown. In this arrangement, input data A and B, each having a word length of 32 bits, are first latched at master and slave latches 1A and 1B, respectively, and then sent to an adder 2 to be processed. If the effective dynamic range of the input data A and B is 16 bits, then the first 16 bits of the input data (all "ones" or "zeroes") have no significance, and thus are wasteful in the overall operation. For example, if the input data A and input data B are 0000 0000 0000 0000 0110 0010 0000 0001 and 0000 0000 0000 0000 0100 0000 1000 1000, respectively, then the added result of the two 32-bit data is:

```
   A  0000 0000 0000 0000 ┊0110 0010 0000 0001
 + B  0000 0000 0000 0000 ┊0100 0000 1000 1000
      ─────────────────────────────────────────
      0000 0000 0000 0000 ┊1010 0010 1000 1001
```

It is clear, therefore, that the first 16 bits do not affect the added result. Further, although the operation of the first 16 bits is only a 0+0=0 operation, the added result of the first 16 bits for the previous input data may contain data bits of "1". Thus, the adder has to perform several state switches from 1 to 0 (1→0) resulting in needless switching of the state (power consumption switching).

For an another example, if the input data A and B are 0000 0000 0000 0000 0110 0010 0000 0001 and 1111 1111 1111 1111 1100 0000 1000 1000, respectively, then the added outcome

```
   A  0000 0000 0000 0000 ┊0110 0010 0000 0001
 + B  1111 1111 1111 1111 ┊1100 0000 1000 1000
      ─────────────────────────────────────────
      0000 0000 0000 0000 ┊0010 0010 1000 1001
```

It can be seen from the added result that, the first 16 bits all have a carry, but the resulting "zeroes" do not affect the added result. Therefore, power consumption resulting from theses witching activities of the first 16 bits is unnecessary.

In these two examples, it can be seen that the power consumption of the circuit can be significantly reduced when the 32-bit adders are replaced with the 16-bit adders. Consequently, this invention provides an improved adder for determining the number of bits of the adder to be used by detecting in advance the effective dynamic range of the input data to prevent unnecessary state change.

FIRST EMBODIMENT

Figure 2:
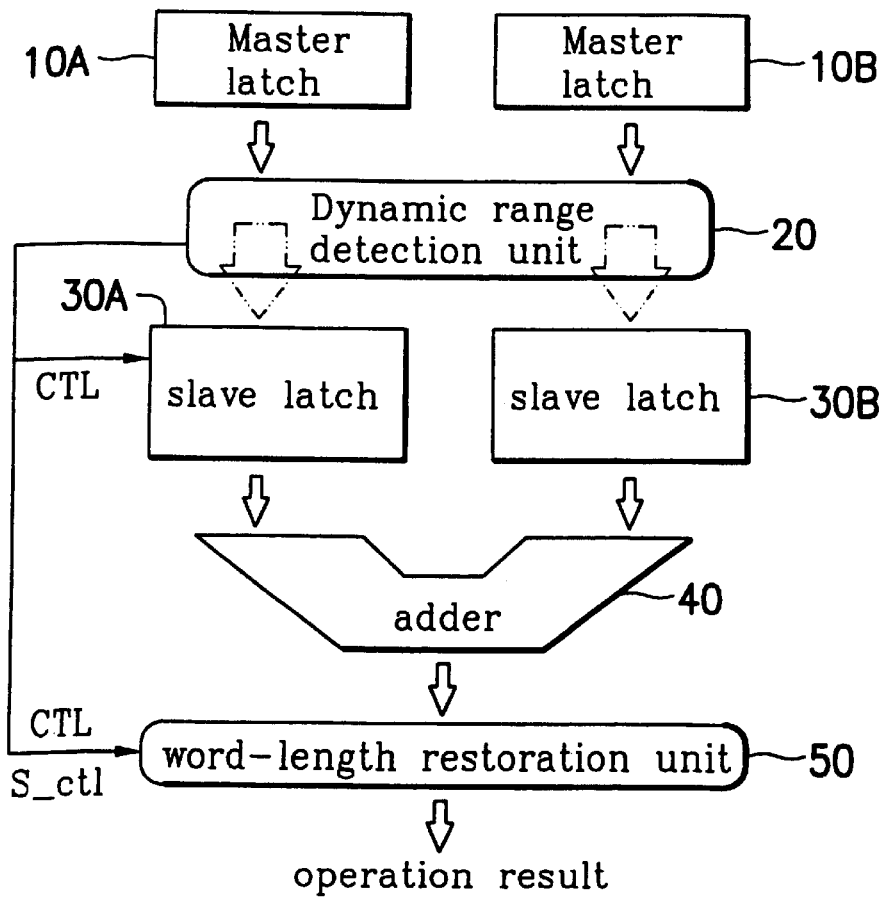
FIG. 2 illustrates the structure of a first embodiment of the adder of this invention.

Referring to FIG. 2, the structure of a first embodiment of an adder of this invention is illustrated. As shown in FIG. 2, the adder includes: master latches 10A and 10B, a dynamic range detection unit 20, slave latches 30A and 30B, an adder 40, and a word-length restoration unit 50. In contrast to the arrangement shown in FIG. 1, the master-slave latches 1A and 1B of input data A and B are divided into the master latches 10A and 10B and the slave latches 30A and 30B, while the dynamic range detecting unit 20 is arranged between the master latches 10A and 10B and the slave latches 30A and 30B. The dynamic range detection unit 20 is used to detect the effective dynamic range of the input data A and B, to latch the values of the effective dynamic-range bits at the slave latches 30A and 30B in accordance with the input data A and B, and to maintain the remaining bits corresponding to the slave latches 30A and 30B at their previous states. In this way, unneeded switching (power consumption switching) will not occur at parts other than those corresponding to the effective dynamic range of the adder 40. Thus, the overall power consumption of the adder will be greatly reduced. In this example, the master latches 10A and 10B and the slave latches 30A and 30B may be formed with flip-flops.

Next, the operation process of the adder of FIG. 2 will be described.

When the input data A and input data B are sent to and latched at the master latches 10A and 10B, respectively, the dynamic range detection unit 20 first checks the effective dynamic range of each of the input data A and B and generates control signals CTL and S-ctl. The bit switching of the slave latches 30A and 30B is determined in accordance with this control signal CTL whether to hold or pass the bits corresponding to the input data A and B. In this example, only those bits corresponding to the effective dynamic range will be transmitted to and latched at the slave latches 30A and 30B, whereas other bits will be held. Therefore, the adder 40 performs only operations of the bits corresponding to the effective dynamic range, while parts corresponding to other bits will not have switching and are maintained at their previous state. Thus, power consumption due to charge-discharge of the capacitance nodes associated with these non-activated bits will not occur. Further, the word-length restoration unit 50 rebuilds the portion being omitted at the adders 40 in accordance with the sign and value of the added result using the control signals CTL and S-ctl to maintain the final added result at a word length of 32 bits.

Figure 3:
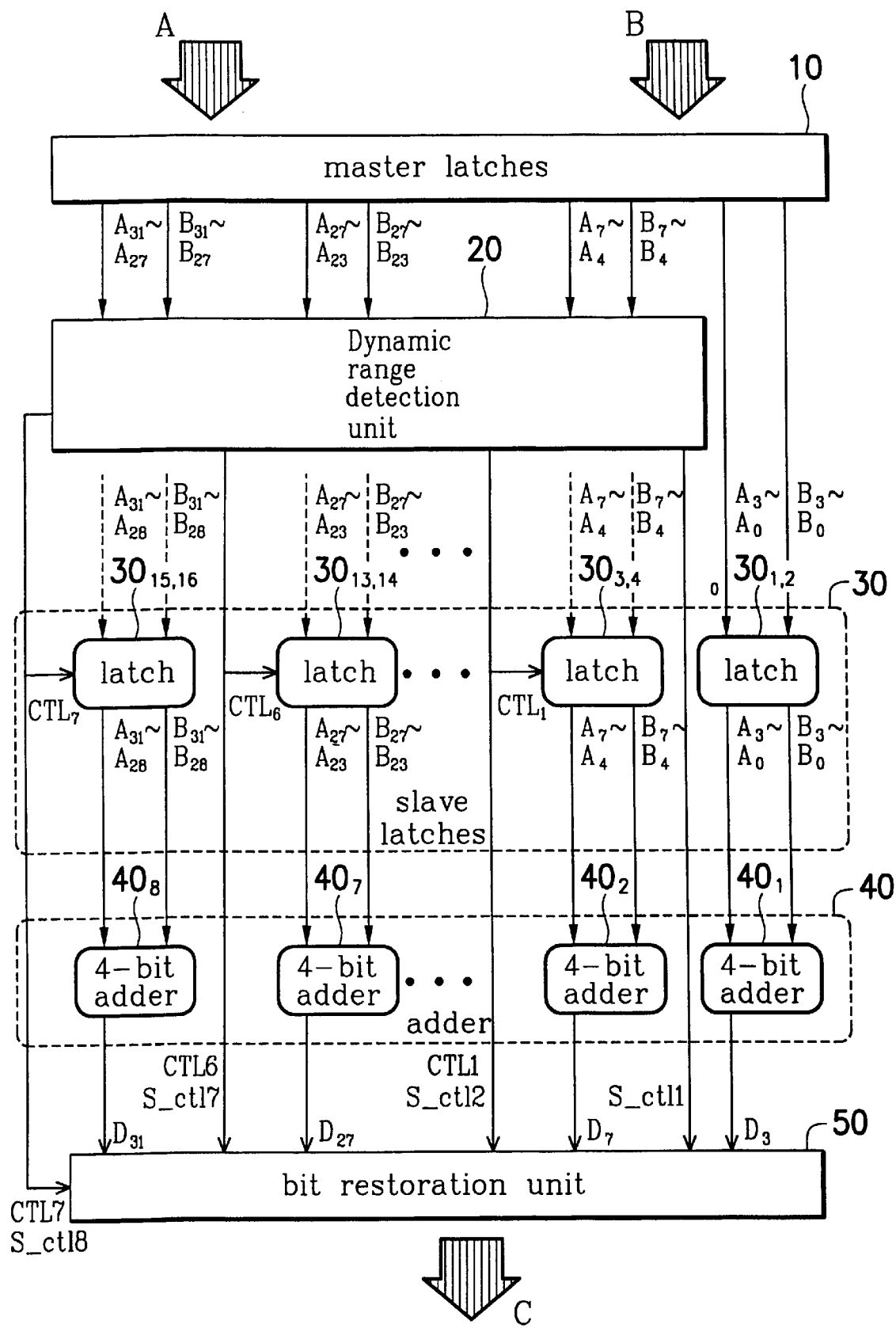
FIG. 3 illustrates the functional blocks of a first embodiment of the 32-bit adder of this invention.

Referring to FIG. 3, functional blocks of the 32-bit adder are shown. FIG. 3 shows a 32-bit adder including two 32-bit master latches 10, a dynamic range detection unit 20, sixteen 4-bit slave latches $30_1$~$30_{16}$, eight 4-bit carry lookahead adders $40_1$~$40_8$, and a word-length restoration unit 50.

When the input data A and input data B are sent to and latched at the master latches 10A and 10B, respectively, the dynamic range detection unit 20 first checks the effective dynamic ranges of the input data A and B outputted from the master latches 10A and 10B and generates control signals $CTL_1$~$CTL_7$ and $S\text{-}ctl_1$~$S\text{-}ctl_8$. In response to control signals $CTL_1$~$CTL_7$, slave latches $30_1$~$30_{14}$ determine whether to hold or pass the bits corresponding to the input data A and input data B. Those bits corresponding to the ineffective dynamic range will be held, where as the bits of the effective dynamic range will be passed. Therefore, the adder 40 will not perform operations of the bits corresponding to the ineffective dynamic range, while parts corresponding to these bits will not have switching and are maintained at their previous states. Thus, power consumption due to state switching frequency and charge-discharge of the capacitance nodes associated with these bits will be significantly reduced. Further, the bits of the effective dynamic range will enter into the adder 40 to be operated on. The subsequent result is rebuilt by the word-length restoration unit 50 in accordance with the sign and value of the added result using the control signals CTL and S-ctl for maintaining the final added result at a word length of 32 bits.

Next, the structure and the circuit of the dynamic range detection unit of FIG. 3 will be described.

Figure 4A:
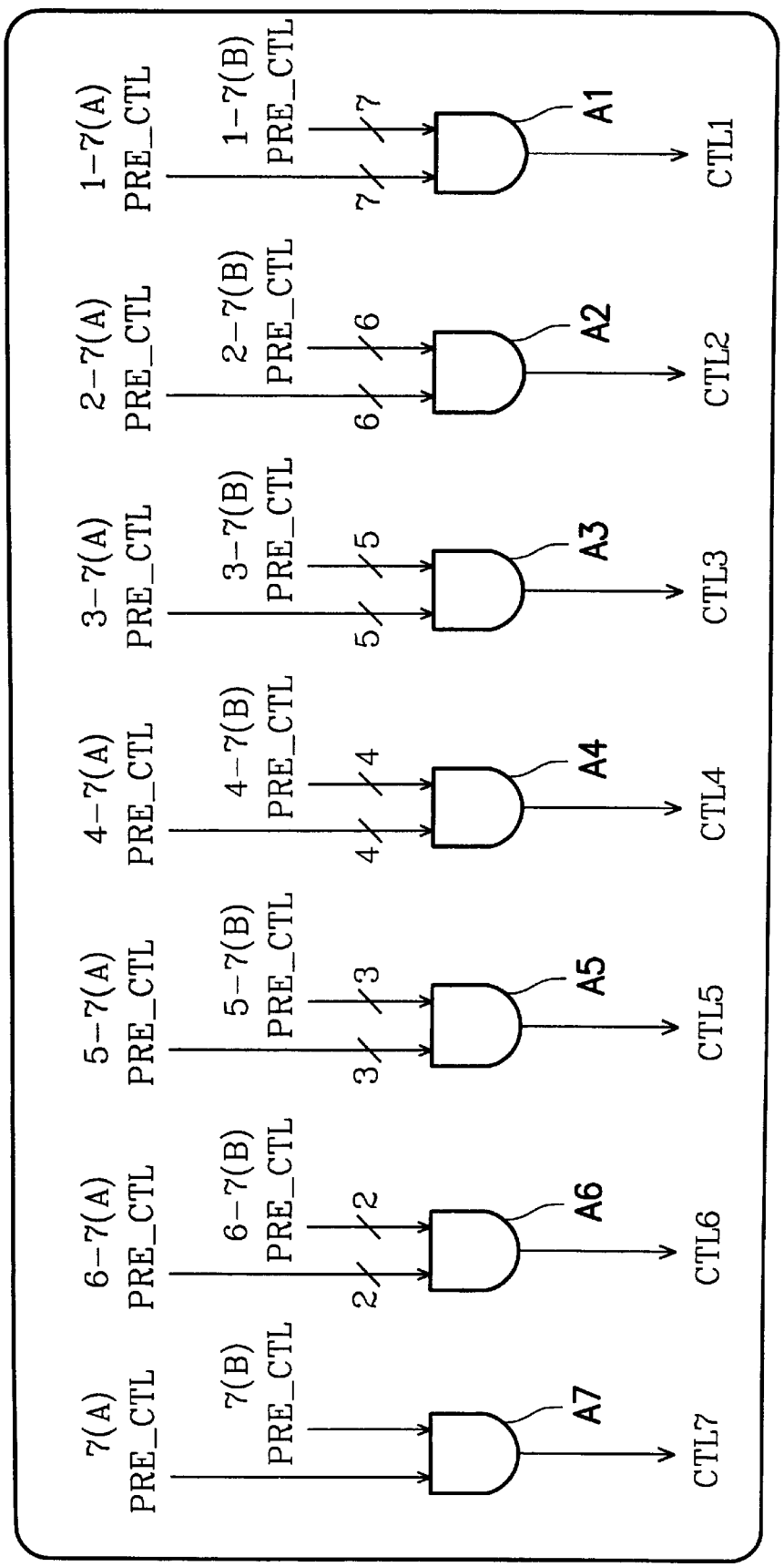
FIGS. 4A(a–c) illustrate the structure of a dynamic range detection unit of the embodiment in FIG. 3.
Figure 4A:
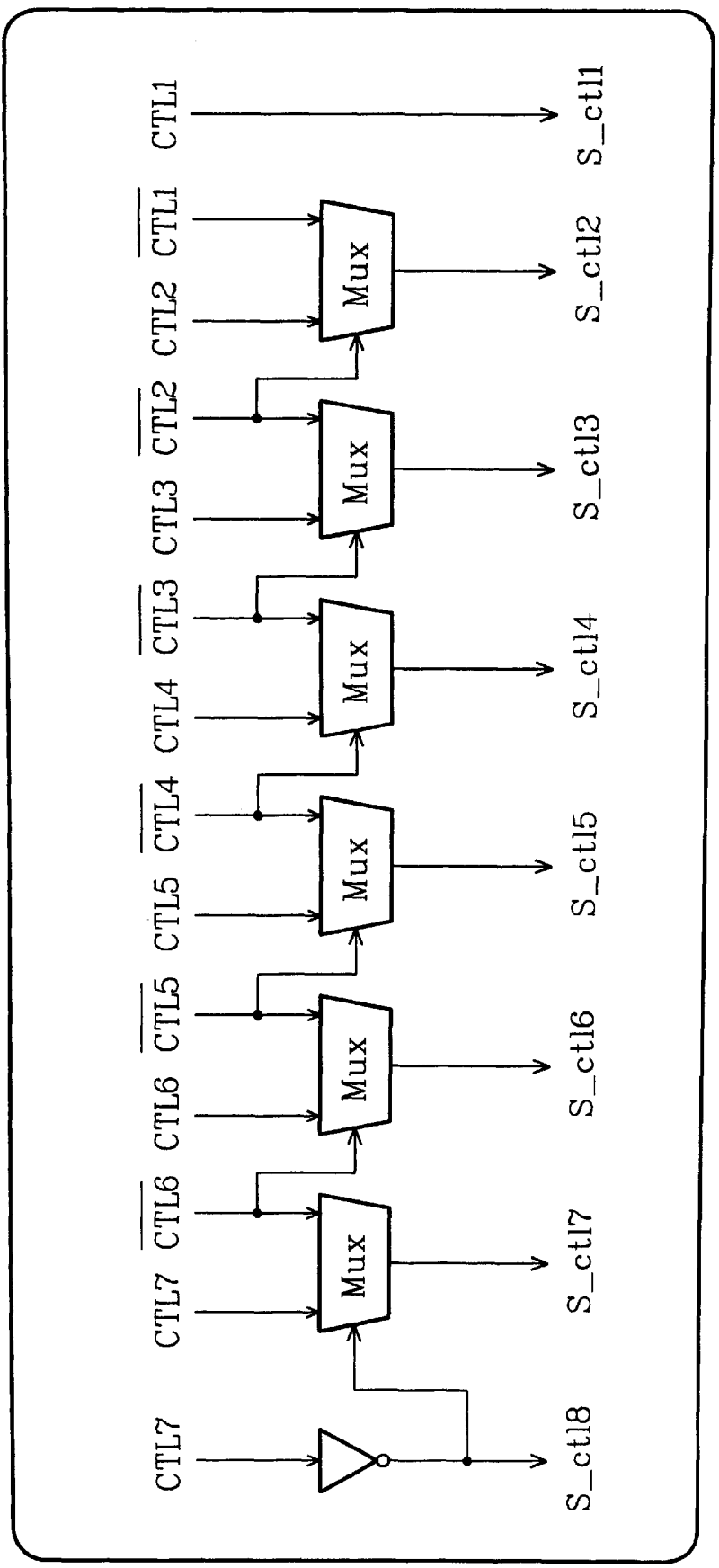

Referring to FIGS. 4A(a–c), a diagram illustrating the structure of a dynamic range detection unit of the embodiment of FIG. 3. FIG. 4A shows the relationship among FIGS. 4A(a–c). The dynamic range detection unit includes fourteen comparators, seven AND gates, and a sign selection function. As shown, the method of detecting the effective dynamic range includes dividing two 32-bit input data words into sixteen groups, with four bits in each group ($A_{31}$~$A_{28}$, $A_{27}$~$A_{24}$, $A_{23}$~$A_{20}$, $A_{19}$~$A_{16}$, $A_{15}$~$A_{12}$, $A_{11}$~$A_8$, $A_7$~$A_4$, $A_3$~$A_0$, $B_{31}$~$B_{28}$, $B_{27}$~$B_{24}$, $B_{23}$~$B_{20}$, $B_{19}$~$B_{16}$, $B_{15}$~$B_{12}$, $B_{11}$~$B_8$, $B_7$~$B_4$, and $B_3$~$B_0$). The fourteen 5-bit comparators are used to sequentially check the first bit of the previous group ($A_{27}$, $A_{23}$, $A_{19}$, $A_{15}$, $A_{11}$, $A_7$, $A_3$, $B_{27}$, $B_{23}$, $B_{19}$, $B_{15}$, $B_{11}$, $B_7$, and $B_3$) with four bits from the subsequent group ($A_{32}$~$A_{28}$, $A_{28}$~$A_{24}$, $A_{24}$~$A_{20}$, $A_{20}$~$A_{16}$, $A_{16}$~$A_{12}$, $A_{12}$~$A_8$, $A_8$~$A_4$, $B_{32}$~$B_{28}$, $B_{28}$~$B_{24}$, $B_{24}$~$B_{20}$, $B_{20}$~$B_{16}$, $B_{16}$~$B_{12}$, $B_{12}$~$B_8$), and $B_8$~$B_4$. Each comparator (shown in FIG. 4B) continues to compare bits so long as the data types of the five bits are found to be the same (all "0s" or "1s"); otherwise, the checking by the comparators stops. After comparison, these fourteen 5-bit comparators generate pre-control signals PRE_$CTL_1$PRE_$CTL_7$ (A) and PRE_$CTL_1$~PRE_$CTL_7$ (B).

Referring to FIGS. 4A(a–c), a second partial circuit is formed with plural AND gates A1~A7 for detecting the common dynamic range of the input data A and B. In this embodiment, each AND gate operates on the pre-control signals of the bits corresponding to the input data A and B and all pre-control signals to determine whether said corresponding bits is a common dynamic range. Specifically, the AND gate $A_7$ performs an AND operation on the pre-control signal PRE_$CTL_7$ of the input data A and the pre-control signal PRE_$CTL_7$ of the input data B; the AND gate $A_6$ performs an AND operation on the pre-control signal PRE_$CTL_6$~PRE_$CTL_7$ of the input data A and the pre-control signal PRE_$CTL_6$~PRE_$CTL_7$ of the input data B; the AND gate $A_5$ performs an AND operation on the pre-control signal PRE_$CTL_5$~PRE_$CTL_7$ of the input data A and the pre-control signal PRE_$CTL_5$~PRE_$CTL_7$ of the input data B; the AND gate $A_4$ performs an AND operation on the pre-control signal PRE_$CTL_4$~PRE_$CTL_7$ of the input data A and the pre-control signal PRE_$CTL_4$~PRE_$CTL_7$ of the input data B; the AND gate $A_3$ performs an AND operation on the pre-control signal PRE_$CTL_3$~PRE_$CTL_7$ of the input data A and the pre-control signal PRE_$CTL_3$~PRE_$CTL_7$ of the input data B; the AND gate $A_2$ performs an AND operation on the pre-control signal PRE_$CTL_2$~PRE_$CTL_7$ of the input data A and the pre-control signal PRE_$CTL_2$~PRE_$CTL_7$ of the input data B; the AND gate $A_1$ performs an AND operation on the pre-control signal PRE_$CTL_1$~PRE_$CTL_7$ of the input data A and the pre-control signal PRE_$CTL_1$~PRE_$CTL_7$ of the input data B. Thus, seven control signals $CTL_1$~$CTL_7$ are obtained to represent the common dynamic range of the input data A and B. For example, when the common dynamic range is 16 bits, the control signals corresponding to the sixteen bits $CTL_1$~$CTL_3$ are "0s," whereas the control signals corresponding to the other bits $CTL_4$~$CTL_7$ are "1s.".

Referring to FIGS. 4A(a–c), the third partial circuit is the sign selection function that includes an inverter and six multiplexors. The sign selection function is addressed by signals $CTL_1$~$CTL_7$ to generate control signals S-$ctl_{1~S-ctl8}$ for indicating the position of the sign bit of the added result.

Figure 4B:
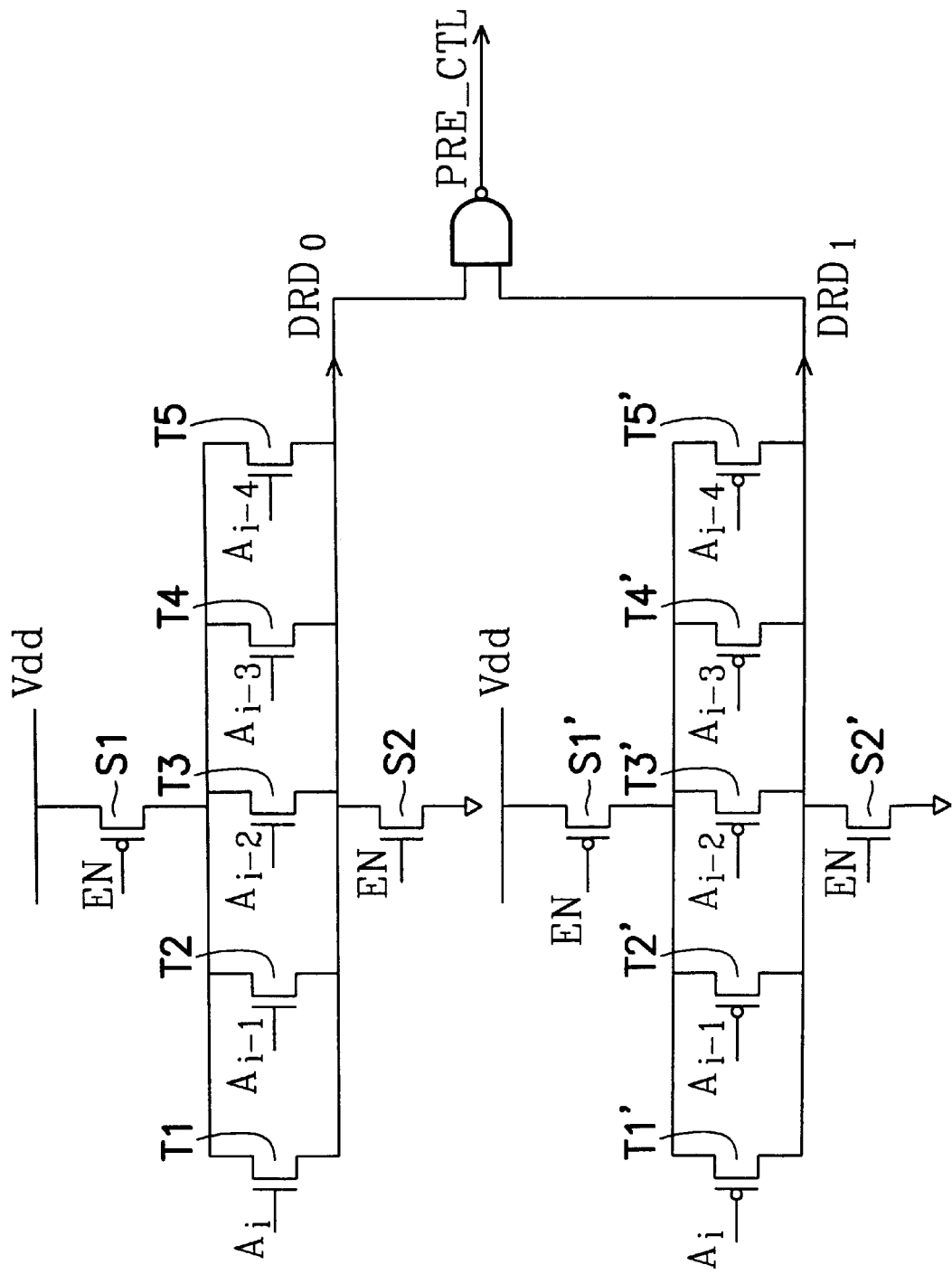
FIGS. 4B–4D illustrate the circuit of a dynamic range detection unit of the embodiment in FIGS. 4A(a–c)
Figure 4C:
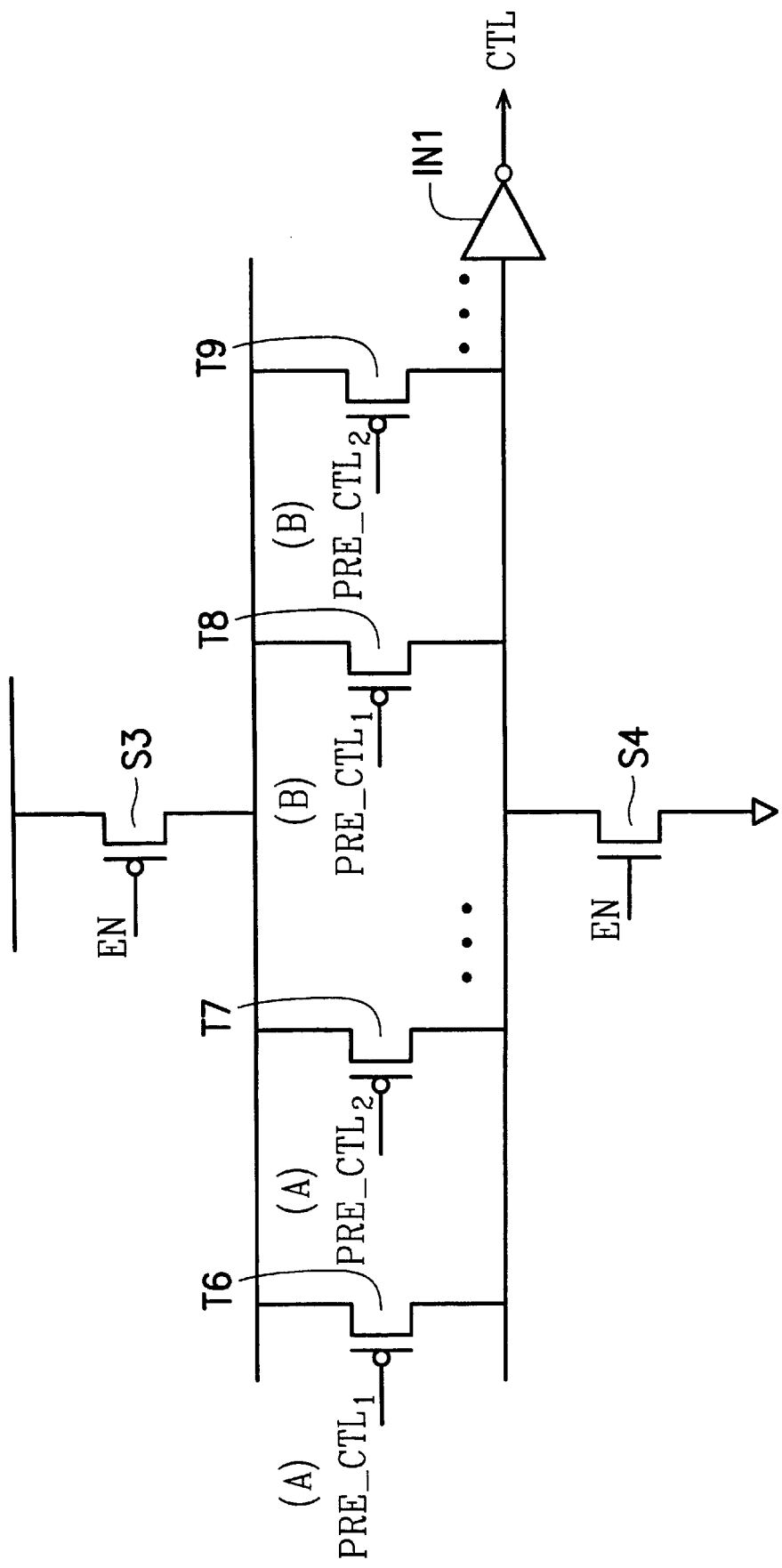
Figure 4D:
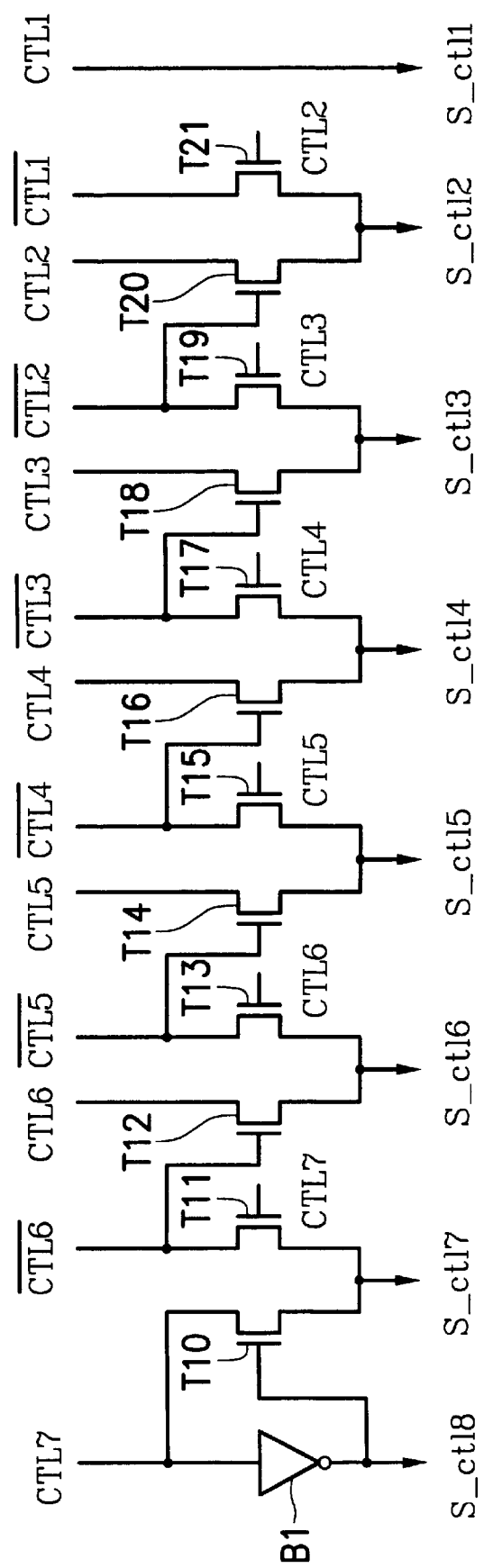

Referring to FIGS. 4B and 4D, the circuit used for each unit of FIGS. 4A(a–c) is shown. In this embodiment, each comparator (shown in FIG. 4B) is formed with five NMOS transistors T1'~T5' connected in parallel. The NMOS transistors and PMOS transistors are connected in series to switch transistors S1~S2 and S1'~S2', respectively. The switch transistors S1~S2 and S1'~S2' are connected to a positive supply line of a power supply and a negative supply line of the power supply, respectively. The five NMOS transistors connected in parallel T1~T5 will be selectively turned on, in accordance with the inputted state of the five bits when the switch transistors S1~S2 are sequentially turned on (that is, the comparator is enabled). The five PMOS transistors connected in parallel T1'~T5' will be selectively turned on in accordance with the inputted states of the five bits when the switch transistors S1'~S2' are sequentially turned on (that is, the comparator is enabled). The NMOS transistors T1~T5 are connected to an output $DRD_0$ of the switch transistor S2. Similarly the end output $DRD_1$ of the PMOS transistors T1'~T5' is connected to the switch transistor S2'. Outputs $DRD_0$ and $DRD_1$ are received by a NAND gate to obtain a corresponding pre-control signal PRE_CTRL. In this embodiment, when the comparator becomes enabled and when the states of the five bits are all "0s" or "1s," then the pre-control signal PRE_CTL is "1;" otherwise, the pre-control signal PRE_CTRL is "0."

FIG. 4C illustrates a detailed circuit of each AND gate of a second partial Circuit of FIGS. 4A(a–c). As shown in the figure, each AND gate is formed with parallel PMOS transistors T6~T9, which together are connected in series with two switches S3 and S4. The pre-control signals (PRE_$CTL_1$, PRE_$CTL_2$, . . . ) corresponding to respective PMOS transistors connected in parallel to determine whether the PMOS transistors are powered ON or OFF. Switching of the two switches connected in series is determined to be ON or OFF by an ENABLE signal of the dynamic range detection unit. When each pre-control signal is "1," the output control signal is "1," or "0" otherwise.

Referring to FIG. 4D, a circuit for checking which bit to start sign extension of the circuit. As shown, this circuit is formed with transistors T10~T21, where the input signals are the control signals $CTL_1$~$CTL_7$ transmitted by the plural AND gates, and the output signals S_$ctl_1$ to S_$ctl_8$ determine the position of the correct sign bit.

Figure 5:
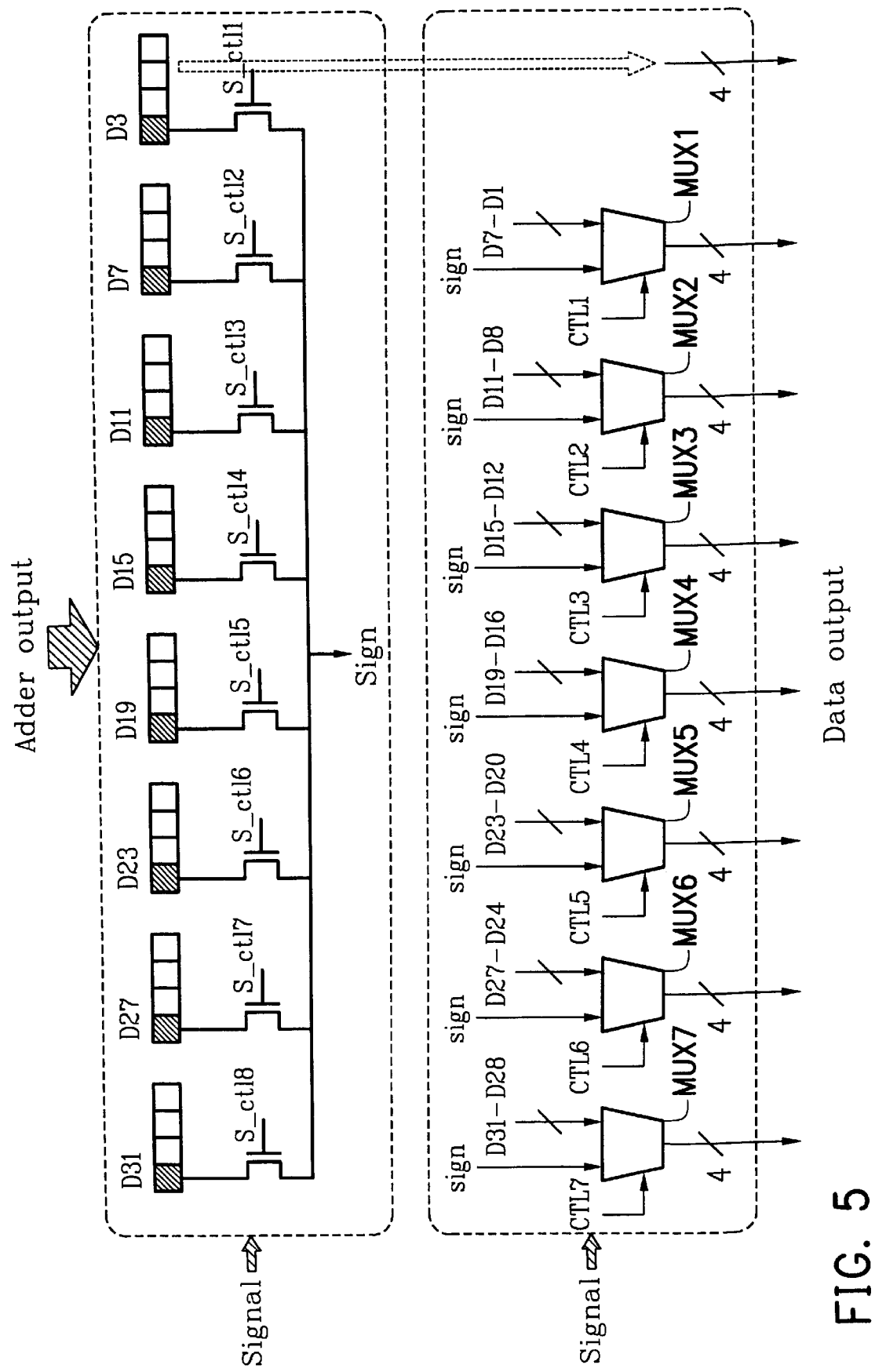
FIG. 5 illustrates the structure of an embodiment of the word-length restoration unit in FIG. 3.

Referring to FIG. 5, a diagram illustrating the circuit of the word-length restoration unit of FIG. 3 is shown. In this embodiment, a sign extension circuit is required in the 2's complement number system whereas in other number systems "0" may be inserted between the sign and the effective dynamic range. The function of this circuit is to first take the real sign bit for multiplexer selection, then select the output of the adder or undertake the sign extension with the control signals through the multiplexers. In this embodiment, the word-length restoration unit first obtains the sign for extension in accordance with the control signals S_ctl previously obtained, then controls multiplexers $MUX_1$~$MUX_7$ with the control signals CTL to determine whether to insert said sign into the bits corresponding to the output data C. When the common dynamic range is sixteen bits (that is, control signals $CTL_1$~$CTL_3$ are "0s" and the control signals $CTL_4$~$CTL_7$ are "1s"), the sign will be inserted into the first sixteen bits of the input data C.

Comparing a conventional adder with the 32-bit adder of this invention, the conventional adder of FIG. 1 consumes power at about 32.49 mW, while the 32-bit adder of this invention consumes power at about 19.29 mW with a 16-bit dynamic data range and 100 MHz operating frequency. Table 1 demonstrates the power consumption and the percentage of power savings at various dynamic ranges of the adder of this invention. It can be seen from the table that the smaller the dynamic range, the greater the power savings achieved by this invention. Moreover, the smaller the dynamic range is, the number of required circuits is less, and accordingly, the less power is consumed.

Figure 6:
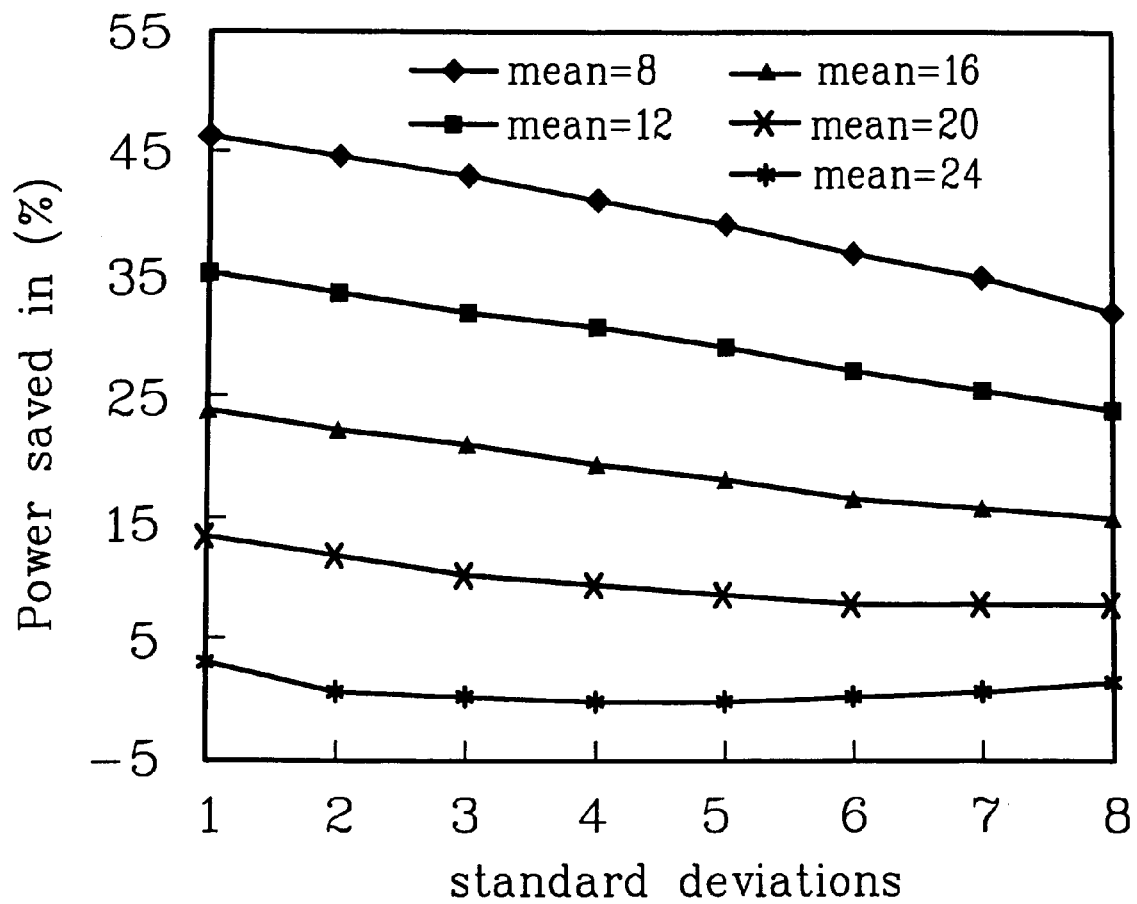
FIG. 6 illustrates power saving ratios of the proposed adder versus the conventional adder using dynamic ranges of input data with the Gaussian distribution.

Referring to FIG. 6, the relationship between the means, and the percentages of power saved as a funtion of standard deviations when the input data are in Guassian distribution is shown.

TABLE 1

| Numbers of the effective dynamic-range bits | Power consumption (mW) | Power saved in percentage (%) |
|---|---|---|
| 32 | 28.20 | 13.20 |
| 28 | 26.42 | 18.55 |
| 24 | 24.06 | 25.67 |
| 20 | 21.68 | 32.87 |
| 16 | 19.29 | 40.09 |
| 12 | 16.92 | 47.37 |
| 8 | 14.51 | 54.75 |

SECOND EMBODIMENT

The development of manufacturing technology has led to the burgeoning demand for portable components. Both digital signal processing (DSP) and application-specific integrated circuits (ASIC) are needed in low power consumption system designs. Multipliers play an important role in these systems (such as digital filters, DSP processors). Power consumption by these multipliers is due to the massive bit additions during an operation. The power consumption of enormous amount of multipliers increases as the ever-increasing operating frequency and, therefore, cannot be overlooked.

The Booth algorithm is a frequently used algorithm in multipliers. The Booth algorithm is a simple and fast method for performing multiplication operations and rendering results. The method selects whether to add or subtract a multiplicand and by shifting data.

Figure 7:
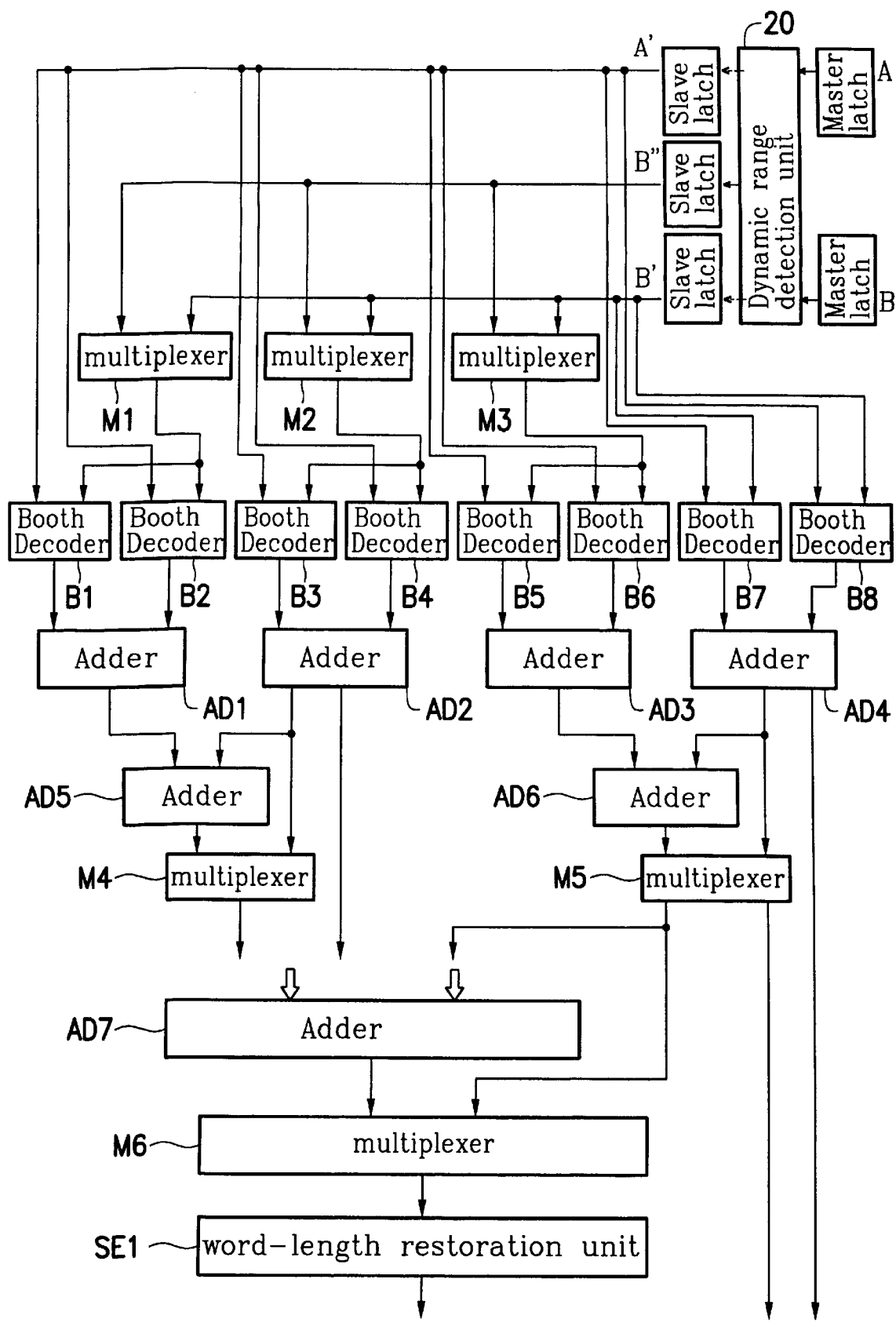
FIG. 7 illustrates the structure of a 16-bit by 16-bit multiplier of the second embodiment of this invention.

Referring to FIG. 7, for the structure of a 16-bit by 16-bit multiplier of a second embodiment of this invention is shown. The multiplier comprises: a dynamic range detection unit 20, multiplexers M1~M6, Booth decoders B1~B8, adders arithmetic device AD1~AD7, and a word-length restoration unit SE1, and Booth algorithm of radix-4 is used to determine whether to add a 0, B, −B, 2B or −2B. In this embodiment, the two sets of data to be multiplied are first latched by the master latches, and go through the dymanic range detection unit 20 to pass the bits of the effective dynamic range to the slave latches and to maintain the bits of the non-effective dynamic range at the previous states. The data stored in the slave latches are then sent to the multiplier for operations, whereby the sign of the output data is complemented with the word-length restoration unit SE1. Since the operation of the word-length restoration unit SE1 is the same as that of the first embodiment, its description is omitted here. Since the design principle of this multiplier is based upon the effective dynamic range of the input data for determining the state switching of the functional units of the multiplier, the inputs of the functional units maintain the previous states, even if the effective dynamic range of the input data A and B is very low (that is, the state will not switch for high-level data). Consequently, there is no switching in the functional units, thus, no power consumption. Further, the state selection is completed by the multiplexer design. Either the input data B" of the previous state or the current input data B' can be selected. Here the most significant bits of the input data B' and A' are set to the previous states in accordance with effective dynamic ranges of the input data A and B, respectively, so the multiplier can perform operations of the effective bits, and the 32 bits of the final complete output can be rebuilt with the word-length restoration unit.

Accordingly, with the exception of adders and multipliers, this invention can be applied to various operating units.

Figure 8:
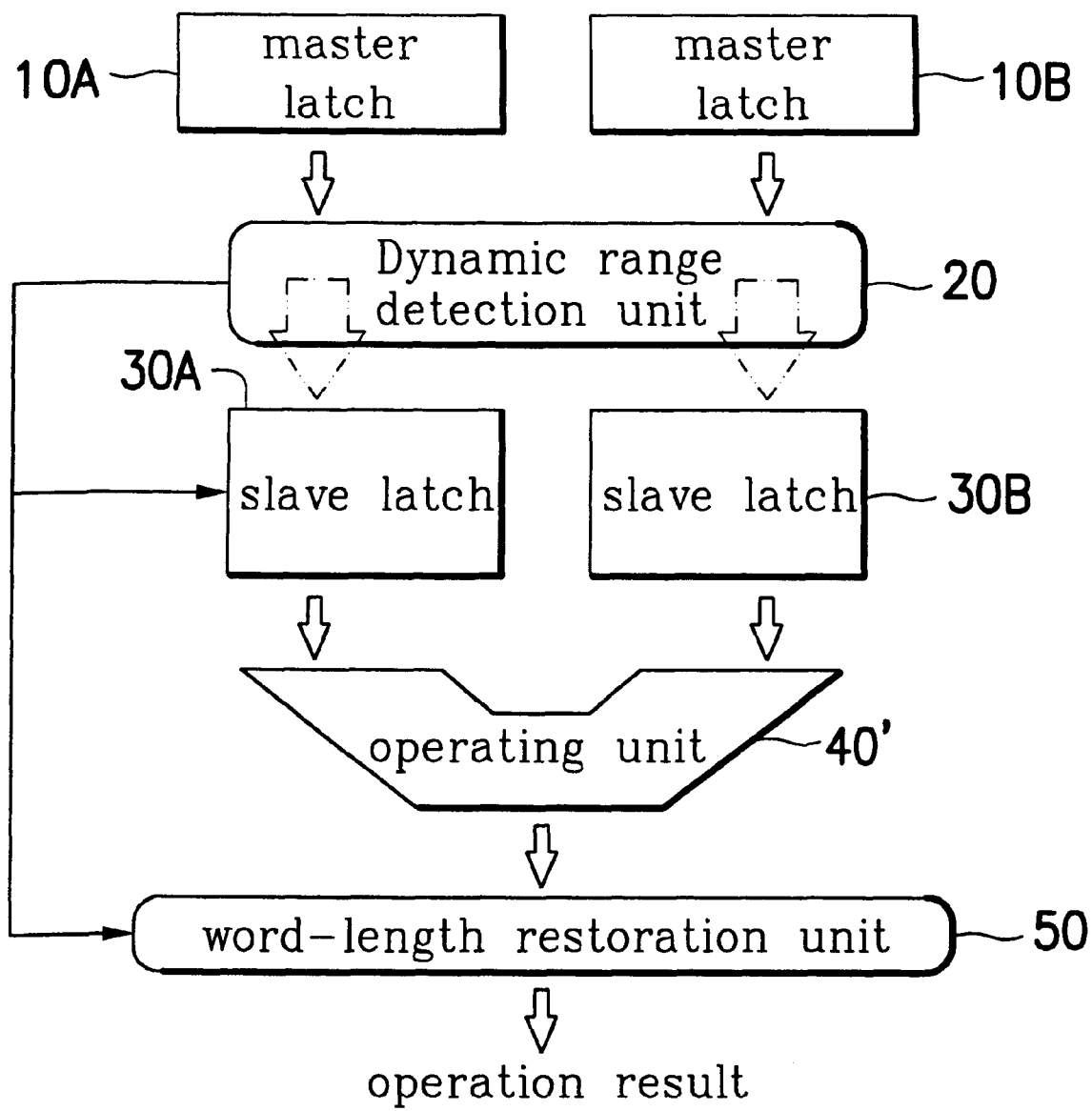
FIG. 8 illustrates the structure of the arithmetic device of this invention.

Referring to FIG. 8, the structure of the arithmetic device of this invention is illustrated. As shown in the figure, the arithmetic device of FIG. 8 is largely the same as the adder of FIG. 2, only the adder 40 is replaced with an operating unit 40'. In said arithmetic device, the master latches 10A and 10B latch the input data A and input data B; the dynamic range detection unit 20 detects the effective dynamic range of the input data A and B, for outputting control signals to represent the length of the effective dynamic range. The slave latches 30A and 30B latch the bits of the effective dynamic range of the input data A and B and maintain the bits of corresponding non-effective dynamic range to the previous states. Hence, the operating unit 40' can perform only the predetermined operations of the bits of the effective dynamic range of the input data A and B to yield an operation result, while the word-length restoration unit complements the operation result to its original output length in accordance with the control signals and the sign of the operation result.

Figure 9:
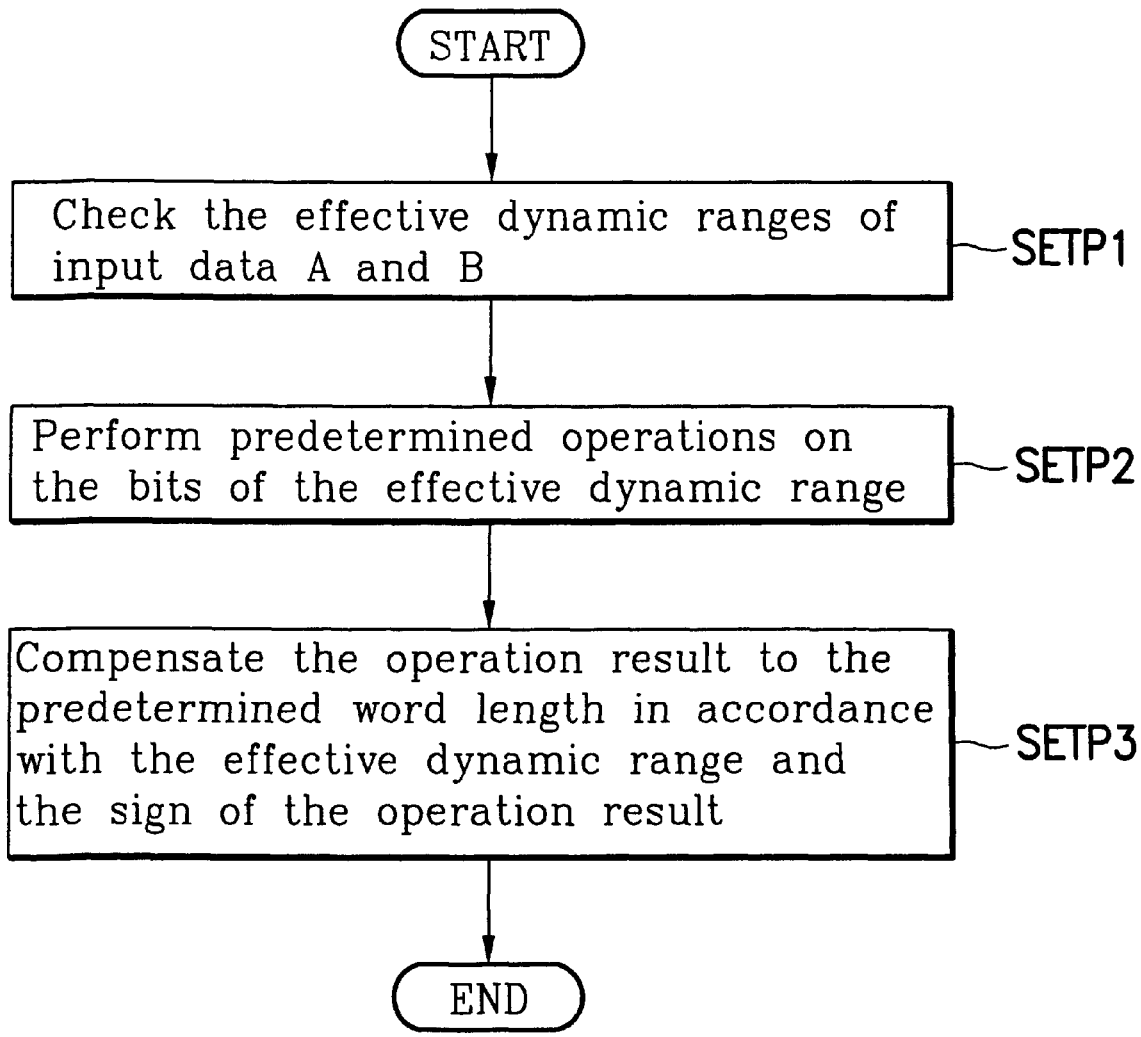
FIG. 9 illustrates the flowchart of the method of reducing power consumption of the arithmetic device of this invention.

Referring to FIG. 9, a flowchart of the method of reducing power consumption of the arithmetic device of this invention is shown. In this method, the input data A and input data B are first latched at the master latches 10A and 10B, and the effective dynamic range of the input data A and input data B are checked with the dynamic range detection unit 20 (STEP 1). Next, bits of the effective dynamic range of input data A and B are performed with predetermined operations (such as addition or multiplication) to obtain an operation result (STEP 2). The output data are then compensated to the predetermined length in accordance with the obtained effective dynamic range and the sign of the operation result (STEP 3). Consequently, the correct operation result is realized with less switching and, thus, less power consumption.

To summarize, an arithmetic device with low power consumption and a method of using such a device has been described. The device and method can be used with any of a wide variety of operating units to reduce the power consumption upon switching of the unused bits by detecting the effective dynamic range of the input data while meeting the mainstream needs for portable products as well as environmental concerns.

Further, this arithmetic device with low power consumption can be applied to various number systems, such as, in certain embodiments by the 2's complement. The 1's complement and other number systems also apply, since the basic flowchart is the same as that of FIG. 9, only the associated devices need to be redesigned.

Moreover, the low power consumption arithmetic device and method of this invention successfully achieve the objects of reducing power consumption and provide the advantage of hardware simplification.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A low power consumption arithmetic device comprising:
   a plurality of master latches, for receiving a plurality of input data;
   a dynamic range detection unit, for receiving said input data from said master latches and for dynamically detecting the effective dynamic range of said input data;
   a plurality of slave latches, for outputting the number of bits of the effective dynamic range of said input data;
   a multiplier, for performing predetermined operations of the bits of the effective dynamic range of said input data for obtaining an operation result; and
   a word-length restoration unit, for compensating said operation result to the original length of the input data by copying the sign bit of the operation result to the ineffective dynamic range of said input data.

2. The low power consumption arithmetic device of claim 1, wherein said master latch includes flip-flops.

3. The low power consumption arithmetic device of claim 1, wherein said slave latch includes flip-flops.

4. The low power consumption arithmetic device of claim 1, wherein the multiplier uses a Booth algorithm.

5. A method of reducing power consumption of arithmetic device comprising:
   receiving a plurality of operating input data;
   detecting the dynamic range of said plurality of input data;
   sending the effective bits of the dynamic range of said data to an arithmetic device;
   performing a multiplication operation with said input data at the arithmetic device, to generate an operation result from said input data; and
   complementing said operation result to its original output length in compliance with the sign of said operation result.

6. The method of claim 5, wherein performing the multiplication operation comprises using a Booth algorithm.

7. The method of claim 5, wherein detecting the dynamic range comprises comparing respectively whether predetermined bits of said input data are the same.

8. The method of claim 7, wherein detecting the dynamic range comprises obtaining a plurality of pre-control signals based on comparison of the predetermined bits.

9. The method of claim 8, wherein detecting the dynamic range comprises determining respectively whether the pre-control signals of the predetermined bits are all within the dynamic range.

10. The method of claim 9, wherein detecting the dynamic range comprises determining a position of the sign bit of an operation result.

11. A low power consumption arithmetic device comprising:
    a plurality of master latches, for receiving a plurality of input data;
    a dynamic range detection unit, for receiving said input data from said master latches and for dynamically detecting the effective dynamic range of said input data;
    a plurality of slave latches, for outputting the number of bits of the effective dynamic range of said input data;
    an operation unit, for performing predetermined operations of the bits of the effective dynamic range of said input data for obtaining an operation result; and
    a word-length restoration unit, for compensating said operation result to the original length of the input data by copying the sign bit of the operation result to the ineffective dynamic range of said input data;
    wherein said dynamic range detection unit comprises
       a plurality of comparators, for comparing respectively whether predetermined bits of said input data are the same and for obtaining a plurality of pre-control signals;
       a plurality of AND gates, for determining respectively whether the pre-control signals of the predetermined bits of said data are all within the dynamic range, for obtaining the effective dynamic range of said data; and
       a sign selection means, for determining the position of the sign bit of an operation result.

12. The low power consumption arithmetic device of claim 11, wherein said operation unit comprises a multiplier.

13. The low power consumption arithmetic device of claim 12, wherein the multiplier uses a Booth algorithm.

14. The low power consumption arithmetic device of claim 11, wherein said master latch includes flip-flops.

15. The low power consumption arithmetic device of claim 11, wherein said slave latch includes flip-flops.

* * * * *